Jan. 16, 1951 T. A. BOWE 2,538,232
INTERNAL EXPANDING BRAKE FOR TRAILER VEHICLES
Filed Feb. 26, 1947 2 Sheets-Sheet 1
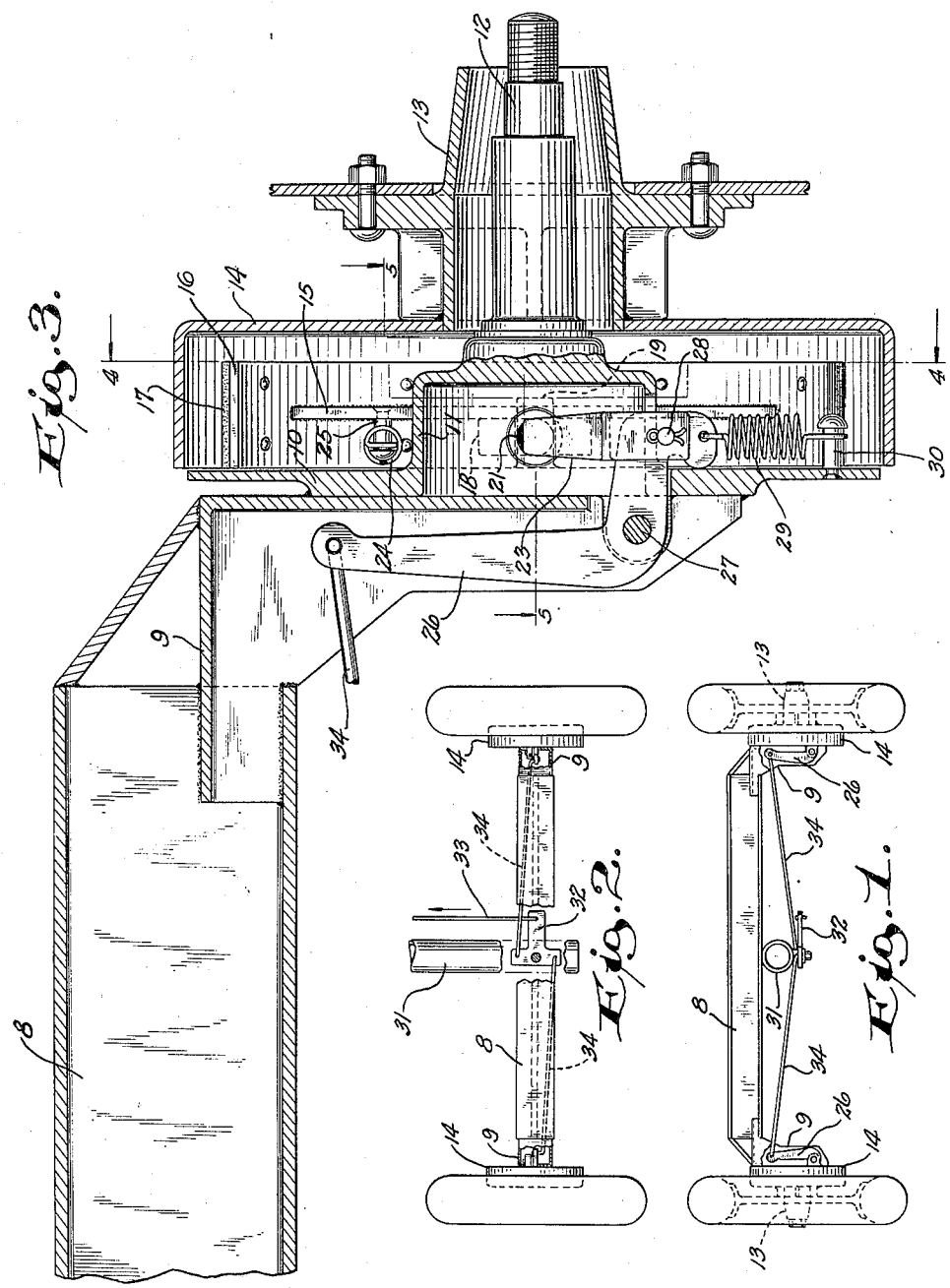
INVENTOR.
Thomas A. Bowe,
BY
Morsell + Morsell
ATTORNEYS.

Jan. 16, 1951          T. A. BOWE          2,538,232
INTERNAL EXPANDING BRAKE FOR TRAILER VEHICLES
Filed Feb. 26, 1947          2 Sheets-Sheet 2

INVENTOR.
Thomas A. Bowe,
BY
Morsell + Morsell
ATTORNEYS

Patented Jan. 16, 1951

2,538,232

UNITED STATES PATENT OFFICE 2,538,232

INTERNAL EXPANDING BRAKE FOR TRAILER VEHICLES

Thomas A. Bowe, Hilbert, Wis.

Application February 26, 1947, Serial No. 730,948

3 Claims. (Cl. 188—78)

This invention relates to improvements in trailer vehicle brakes.

A general object of the invention is to provide an extremely simple but highly efficient vehicle brake assemblage wherein a pair of diametrically opposed brake shoes are simultaneously and equally operated through the application of force along a line which is a median of the opposed brake shoes.

A further object of the invention is to provide a vehicle brake wherein a pair of brake shoes are engaged with the wheel brake drum by the action of a wedge member in one direction, with movement of the wedge member in the opposite direction permitting retraction of the brake shoes under the influence of spring members.

A further object of the invention is to provide a vehicle brake wherein the expansion of a pair of opposed brake shoes, for wheel braking purposes, is accomplished by power applied at a point which is located centrally of the brake drum assemblage.

A further object of the invention is to provide a vehicle brake wherein the component parts thereof may be assembled and disassembled very easily and simply to facilitate replacement of parts, repairs, or relining of the brake shoes.

A further object of the invention is to provide a trailer vehicle brake assemblage which is readily applicable to a pair of wheels of a vehicle and arranged so that the brake members for both wheels may be operated from a common point simultaneously and uniformly.

A further object of the invention is to provide a trailer vehicle brake which is of very simple construction, is strong and durable, is easy to operate, is positive and uniform in its action, and is well adapted for the purposes described.

With the above and other objects in view, the invention consists of the improved trailer vehicle brake and its parts and combinations as set forth in the claims, and all equivalents thereof.

In the accompanying drawings, in which the same reference characters indicate the same parts in all of the views:

Fig. 1 is a schematic rear view of the chassis of a trailer vehicle equipped with the improved brake mechanism for a pair of the vehicle wheels, parts being broken away;

Fig. 2 is a fragmentary inverted plan view of the showing in Fig. 1 with parts broken away and in section;

Fig. 3 is an enlarged fragmentary detail sectional view of the right hand side of the trailer vehicle transverse chassis member and associated brake drum and hub and wheel assembly illustrating the improved brake applied thereto, said view being taken on line 3—3 of Fig. 4;

Figure 4:
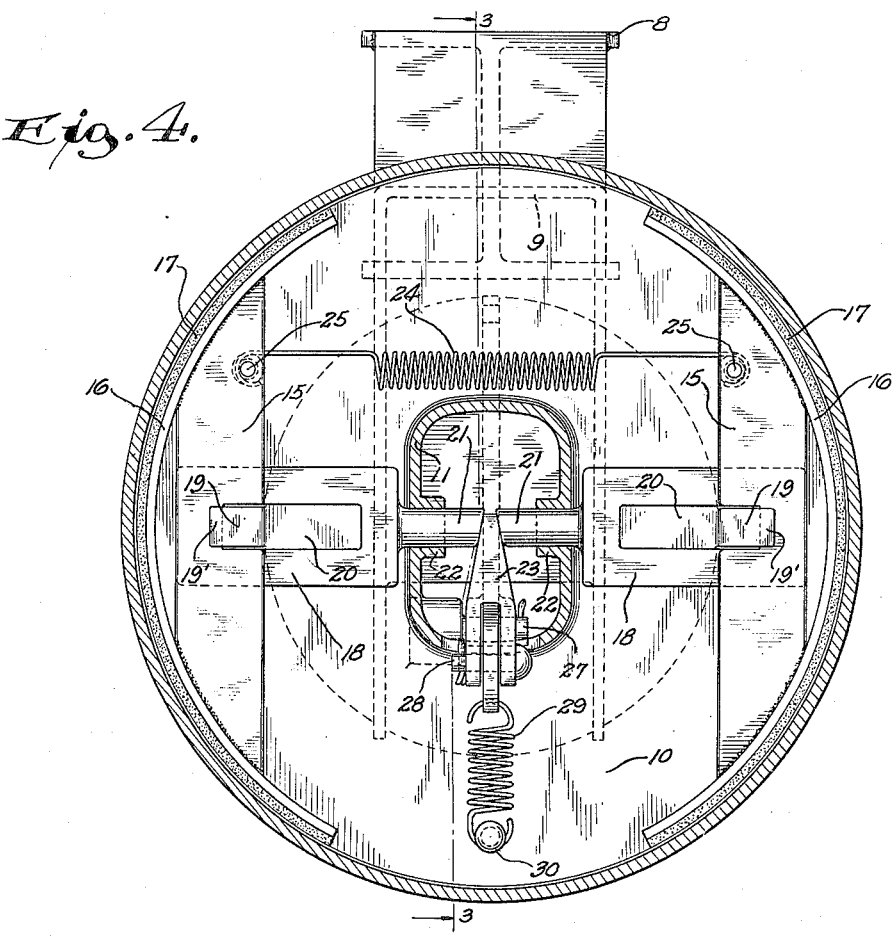
Fig. 4 is a sectional view taken on line 4—4 of Fig. 3.

Although it is not to be limited thereto and is susceptible of wider application, the improved brake mechanisms are highly desirable and effective when incorporated in the hub and wheel assemblies of a trailer vehicle, such as an agricultural implement or wagon which is hitched to a tractor or other propelling towing vehicle. A vehicle of this type, equipped with the improved mechanism, would obviously have the brake control levers extended to a convenient point adjacent the operator's seat or station on the trailer vehicle.

The improved brake mechanisms are adapted to be applied to a pair of wheels of the vehicle and are arranged for joint operation (see Figs. 1 and 2). However, inasmuch as the structure applied to one wheel is a duplicate of that applied to the companion wheel, only one brake assemblage will be described in detail, and in this connection, attention is particularly invited to the showings in Figs. 3, 4 and 5 of the drawings.

A trailer vehicle transverse chassis or frame member is indicated by the numeral 8. Welded or otherwise secured to each end of this chassis member 8 is an angled shaped housing 9 having rigidly secured to its outer face an inner housing disc 10. Said housing disc 10 is provided with an outwardly projecting box section 11 from which projects the vehicle wheel axle 12 enclosed by a hub and wheel assembly 13. Integral with the hub is a brake drum 14 whose open side is adjacent and closed by the inner housing disc 10.

Figure 5:
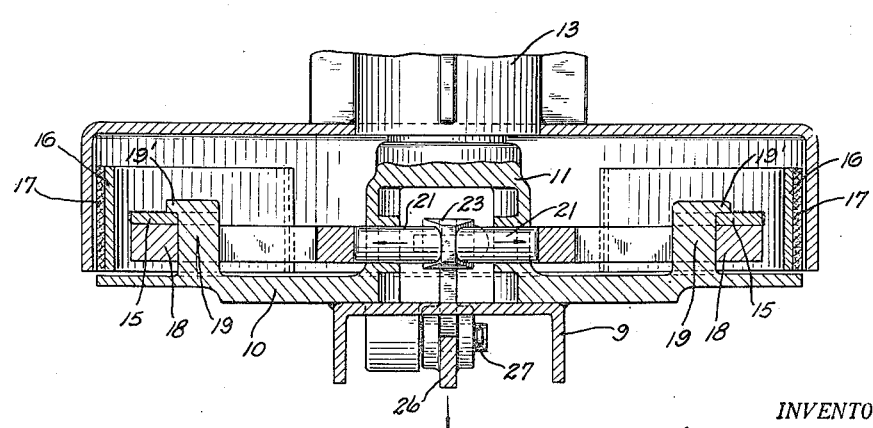
Fig. 5 is a fragmentary detail sectional view taken on line 5—5 of Fig. 3.

Mounted within the brake drum for expansion and retraction relative to the inner surface of the peripheral portion of the brake drum are a pair of diametrically opposed brake shoe straps 15 adapted for reciprocatory movement. Each strap 15 carries a curved brake shoe 16 having a brake lining or suitable friction material 17 applied to its outer face. Each strap 15 is furthermore positioned at right angles to and rigidly carried by a reciprocatory slotted block 18. To guide the blocks 18 and straps 15 in their rectilinear movement and to prevent rocking or torsional movement, the housing disc 10 is provided with outwardly projecting guide posts 19 projecting through slots 20 therefor in the members 15 and 18. As is best shown in Figs. 4 and 5, the outer ends of the posts 19, adjacent the straps 15, have overhanging flanges 19' which additionally aid in stabilizing the rectilinear movement of the members 15 and 18. The slots extend substantially along the blocks 18 and this facilitates assembly and disassembly of the structure. The inner ends of the blocks 18 are formed with brake shoe shafts 21 movably guided in alined bosses 22 formed on inner wall portions of the box section 11. The outer ends of the brake shoe shafts 21 are angled, as is best shown in Fig. 4, to cooperate with the surfaces of a tapered wedge 23 which is mounted for movement therebetween so as to positively expand or to permit retraction of the brake shoes 16. Expansion of the brake shoes is against the tension of a coiled spring 24 whose opposite extremities are anchored to posts 25 projecting from the straps 15.

As will best appear from Fig. 3, a bell crank lever 26 is intermediately pivotally mounted, as at 27, within the angled shaped housing 9. The lower arm of the bell crank lever projects through a slot therefor in the inner housing disc 10, into the brake drum 14, and it is pivotally connected, as by a pin 28, to the bifurcated lower extremity of the wedge 23. A coiled spring 29, having its opposite ends connected respectively to the inner arm of the bell crank lever 26 and to a post 30 projecting inwardly from the housing disc 10, normally yieldingly holds the inner end of the bell crank lever 26 in a downwardly pivoted position so as to yieldingly maintain the wedge 23 in the position of Fig. 4. In the latter position, the wedge is not exerting an expanding force on the brake shoe shafts 21 with the result that the members 15 and 18, carrying the brake shoes 16, are retracted so that the brake shoes are separated from the brake drum and are not then applying a braking pressure thereto.

The pivotal mounting of the wedge 23 is somewhat loose or "sloppy" with the result that the wedge, in moving, may, if necessary, move laterally somewhat. Hence, if there is any wear on the brake shoe shafts 21 or associated parts, the wedge will always tilt sufficiently to equally contact and exert pressure against the adjacent inner ends of said shafts 21, insuring under all conditions, equalization of force applied to the shafts for brake operating purposes.

The means for operating and simultaneously uniformly applying and releasing a pair of brake assemblages associated with the companion wheels of a trailer vehicle is best shown in Figs. 1 and 2. The central longitudinal chassis member 31 of the trailer vehicle has pivotally connected thereto a T-shaped lever 32. To the outer end of the long arm of the lever 32 is connected one extremity of an operating rod 33. The other extremity of the operating rod 33 is connected with a conventional brake operating lever (not shown) which extends adjacent the driver's seat or station at the front of the trailer vehicle. To opposite ends of the head of the T lever 32 are pivotally attached oppositely directed bell crank lever operating rods 34—one extending to each brake assemblage of the companion wheels. The outer end of a rod 34 is pivotally connected to the upper end portion of a bell crank lever 26. Thus, when the longitudinal rod 33 is pulled forwardly, or in the direction of the arrow in Fig. 2, the T lever 32 will be turned in a counterclockwise direction relative to Fig. 2, causing a pull on both of the bell crank lever operating rods 34. This will rock the bell crank levers 26 in a direction which will raise their lower arms, thereby lifting the wedges 23 against the action of the coiled springs 29. The elevation of the wedges 23 will cause spreading of the brake shoe shafts 21 for each assemblage, moving the pairs of members 20 outwardly, thereby applying the brake shoes and lining thereon against the brake drums to brake the wheels of the trailer vehicle. Such application of the brake shoes is against the tension of the coiled springs 24. Consequently, when brake applying pressure on the brake operating lever is released, the springs 24 will retract the brake shoes, the springs 29 will lower the wedges 23 to permit inward movement of the shafts 21 and the bell crank levers 26 will be rocked to their normal positions thereby exerting outwardly directed pulls on the rods 34 which will straighten the T lever 32 to the position of Fig. 2 and rearwardly reciprocate the longitudinal rod 33. The T lever 32 and its connections insures equal and simultaneous application and release of the pair of brake assemblages for the companion wheels.

The improved brake assemblage is such that straight line power is applied to the brake shoe shafts 21 and the application of this power is along a line which constitutes a median between the pair of diametrically opposed brake shoes of an assemblage. Hence, the brake shoes move in opposite directions under an equal application of power with the braking pressure being applied by both brake shoes to opposite surface portions of the brake drum in an equal manner. The improved brake shoes are adapted to expand and contract through rectilinear movement emanating from a point which is centrally located relative to the brake drum, whereas conventional brake shoes expand and contract circumferentially relative to the brake drum.

The improved trailer vehicle brake is simple mechanically, is easy to assemble and disassemble, is uniform and positive in its action, and is well adapted for the purposes described.

What is claimed as the invention is:

1. In a vehicle brake assemblage including a circular brake drum, a pair of diametrically opposed, curved brake shoes within said drum, a brake shoe carrier for each brake shoe, said carriers being reciprocatably mounted within the brake drum for movement to and from the periphery of the latter, each carrier having a stem terminating spacedly adjacent the center of the drum, a wedge compensatingly laterally movably interposed between the ends of said stems, and means for moving said wedge in a path at right angles to the axes of said stems to equally spread said stems relative to each other whereby the carries are reciprocated outwardly equally to apply the brake shoes to the brake drum.

2. In a vehicle brake assemblage including a circular brake drum, a pair of diametrically opposed, curved brake shoes within said drum, a brake shoe carrier for each brake shoe, said carriers being reciprocatably mounted within the brake drum for movement to and from the periphery of the latter, each carrier having a radially directed stem terminating spacedly adjacent the center of the drum, the ends of said stems being beveled, a wedge interposed between the beveled end of said stems, means mounting the wedge so that it may be forcefully moved in a path at right angles to the axes of said stems and in a direction to spread said stems relative to each other and to tilt slightly to centralize itself between said stems whereby the carriers are simultaneously and uniformly reciprocated outwardly to equally apply the brake shoes to the brake drum, and spring means for moving the wedge in the opposite direction.

3. In a vehicle brake assemblage including a circular brake drum, a pair of diametrically opposed, curved brake shoes within said drum, a brake shoe carrier for each brake shoe, said carriers being reciprocatably mounted within the brake drum for movement to and from the periphery of the latter, each carrier having a radially directed stem terminating spacedly adjacent the center of the drum, a wedge having rectilinear contacting surfaces interposed between the ends of said stems, means mounting said wedge for advancement and retraction and for slight tilting movements for self-centralization between the ends of said stems, a bell-crank lever connected to said wedge for forcefully moving the latter in a path at right angles to the axes of the stems and in a direction to spread said stems relative to each other whereby the carriers are uniformly reciprocated outwardly to equally apply the brake shoes to the brake drum, an operating rod attached to the lever for rocking it, and a spring yieldingly connecting said carriers to retract the same when the wedge is moved in the opposite direction.

THOMAS A. BOWE.

REFERENCES CITED

The following references are of record in the file of this patent:

UNITED STATES PATENTS

| Number | Name | Date |
| --- | --- | --- |
| 1,563,636 | Lewis | Dec. 1, 1925 |
| 1,594,259 | Hardman | July 27, 1926 |
| 1,666,390 | Marley | Apr. 17, 1928 |
| 2,032,473 | Crossland | Mar. 3, 1936 |
| 2,071,420 | Napolitan | Feb. 23, 1937 |
| 2,072,755 | Jones et al. | Mar. 2, 1937 |
| 2,100,174 | Ruffino | Nov. 23, 1937 |